(12) United States Patent
Matsumura et al.

(10) Patent No.: US 7,545,447 B2
(45) Date of Patent: Jun. 9, 2009

(54) DISPLAY APPARATUS HAVING MULTIPLE SOURCE-DEPENDENT DISPLAY MODES

(75) Inventors: Kenichiro Matsumura, Tokyo (JP); Miwako Yoritate, Tokyo (JP)

(73) Assignee: Sony Corporation (JP)

( * ) Notice: Subject to any disclaimer, the term of this patent is extended or adjusted under 35 U.S.C. 154(b) by 385 days.

(21) Appl. No.: 11/031,584

(22) Filed: Jan. 7, 2005

(65) Prior Publication Data

US 2005/0179816 A1    Aug. 18, 2005

(30) Foreign Application Priority Data

Jan. 7, 2004   (JP)   ............................ P2004-002504

(51) Int. Cl.
*H04N 5/268* (2006.01)
*H04N 5/50* (2006.01)
*H04N 5/64* (2006.01)

(52) U.S. Cl. .................... 348/839; 348/569; 348/705

(58) Field of Classification Search ................ 348/554, 348/553, 552, 705, 706, 839, 569; 725/38; 710/8–12
See application file for complete search history.

(56) References Cited

U.S. PATENT DOCUMENTS

| | | | | |
|---|---|---|---|---|
| 5,283,560 | A * | 2/1994 | Bartlett ....................... | 715/729 |
| 5,499,221 | A * | 3/1996 | Ito et al. ................... | 369/53.22 |
| 5,737,028 | A * | 4/1998 | Bertram et al. ............... | 725/37 |
| 5,777,605 | A * | 7/1998 | Yoshinobu et al. ........... | 345/173 |
| 5,977,704 | A * | 11/1999 | Shi et al. ..................... | 313/504 |
| 6,111,614 | A * | 8/2000 | Mugura et al. .............. | 348/569 |
| 6,118,427 | A * | 9/2000 | Buxton et al. ............... | 345/629 |
| 6,295,002 | B1 * | 9/2001 | Fukuda ..................... | 340/636.1 |
| 6,493,038 | B1 * | 12/2002 | Singh et al. ................. | 348/565 |
| 6,501,511 | B2 * | 12/2002 | Sekimoto et al. ............ | 348/553 |
| 6,930,661 | B2 * | 8/2005 | Uchida et al. ................. | 345/87 |
| 2002/0032911 | A1 * | 3/2002 | Tanaka et al. ............... | 725/153 |
| 2002/0042925 | A1 * | 4/2002 | Ebisu et al. ................. | 725/151 |
| 2002/0049620 | A1 * | 4/2002 | Uchida et al. .................. | 705/5 |
| 2002/0054028 | A1 | 5/2002 | Uchida et al. | |
| 2002/0071057 | A1 * | 6/2002 | Kaneda et al. .............. | 348/588 |

(Continued)

FOREIGN PATENT DOCUMENTS

JP        06-326887 A        11/1994

(Continued)

*Primary Examiner*—Victor R. Kostak
(74) *Attorney, Agent, or Firm*—Lerner, David, Littenberg, Krumholz & Mentlik, LLP

(57) ABSTRACT

A display apparatus for video signals has improved operability. The display apparatus includes a tuner which receives a video signal, an external input unit into which a video signal is input from the outside, a display processor operable to select one of the video signal received by the tuner or that obtained from the external input unit as a main video and to perform display processing on the main video, a display unit operable to display the video signals processed in the display processor, an operation unit and a controller operable to combine an operation guidance video with the main video to form a combined display based on a predetermined operation in the operation unit, and to display the combined display, wherein the combined display is displayed in different display modes depending on which video signal forms the main video. The operation unit may be in the form of a touch panel. Furthermore, when a specific button is operated, a display to select a function is performed.

5 Claims, 11 Drawing Sheets

U.S. PATENT DOCUMENTS

| | | | |
|---|---|---|---|
| 2002/0126226 A1* | 9/2002 | Dudkowski | 348/722 |
| 2002/0163592 A1* | 11/2002 | Ueda | 348/602 |
| 2004/0141335 A1* | 7/2004 | Lee et al. | 362/555 |
| 2005/0113059 A1* | 5/2005 | Hubbard | 455/353 |
| 2005/0165918 A1* | 7/2005 | Wantanabe et al. | 709/223 |
| 2005/0174489 A1* | 8/2005 | Yokoyama et al. | 348/553 |
| 2005/0262535 A1* | 11/2005 | Uchida et al. | 725/80 |

FOREIGN PATENT DOCUMENTS

| | | |
|---|---|---|
| JP | 2002/033714 A | 1/2002 |
| JP | 2002-034023 A | 1/2002 |

* cited by examiner

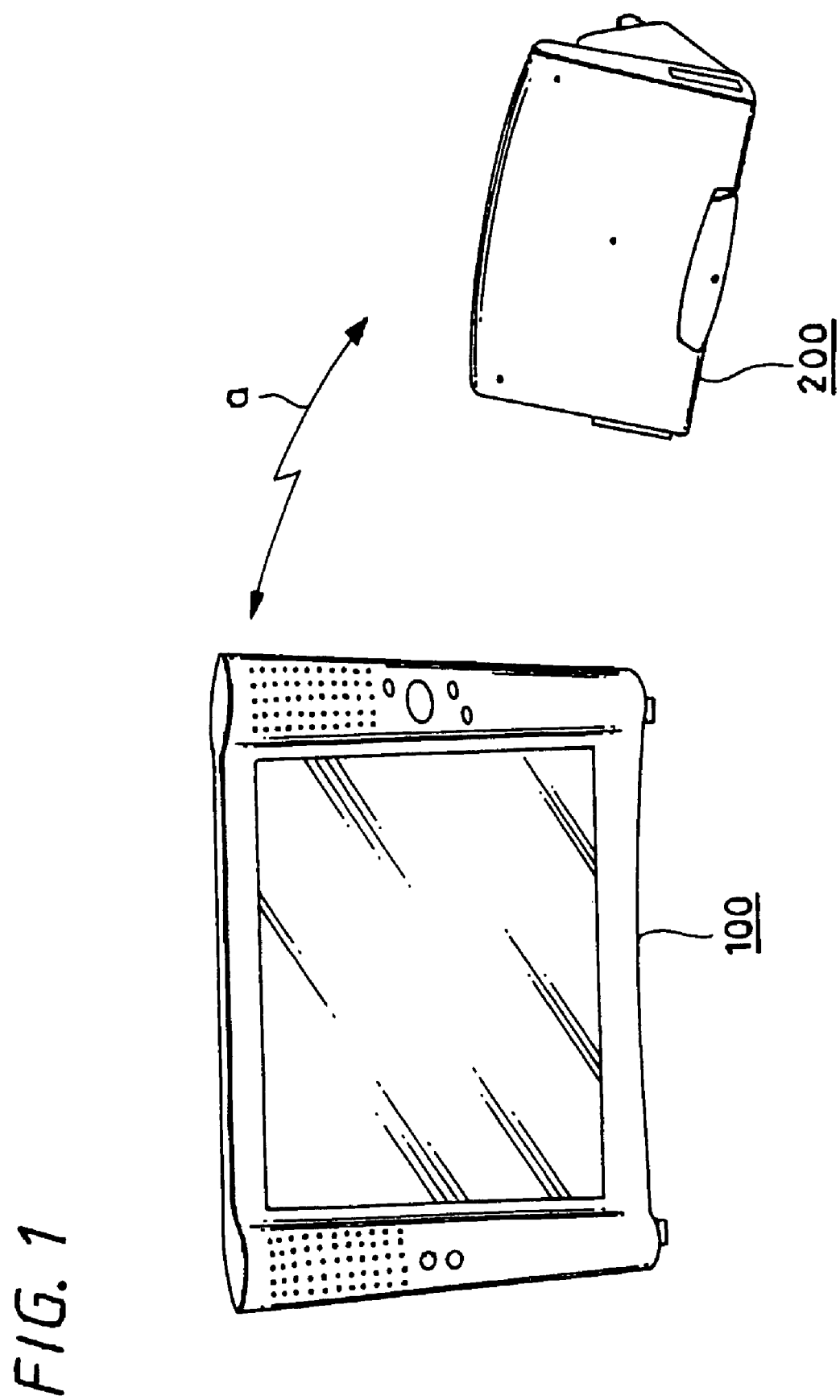

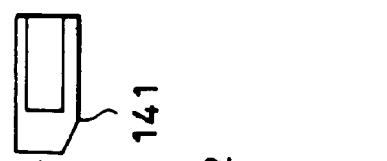
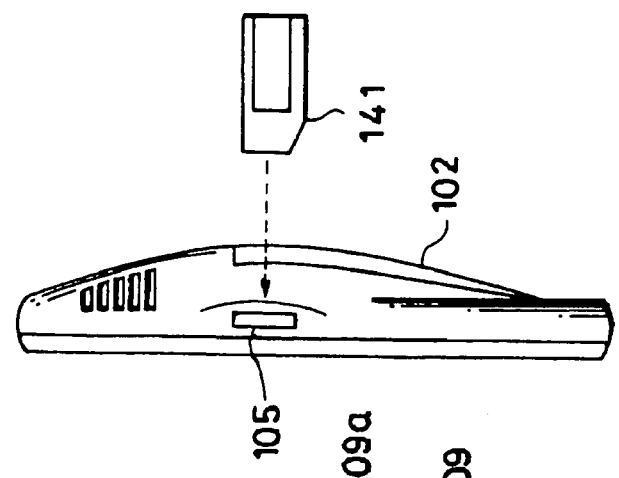
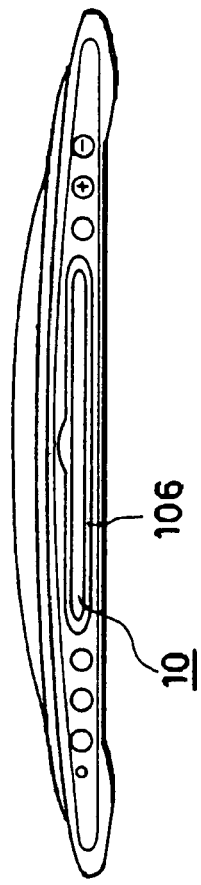
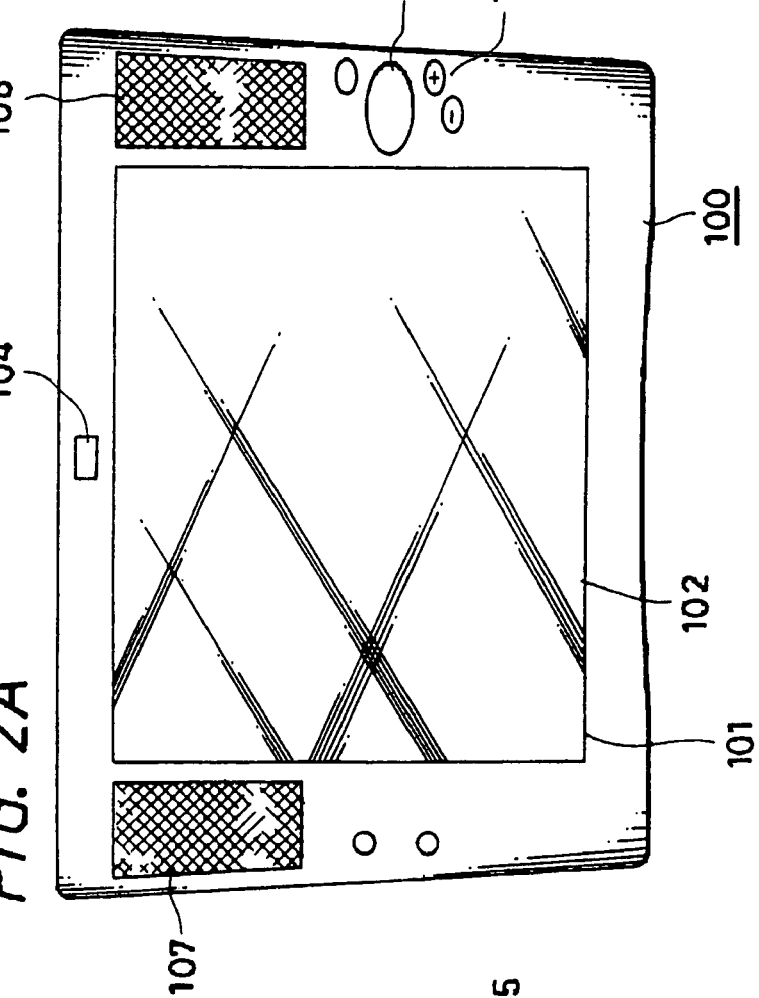
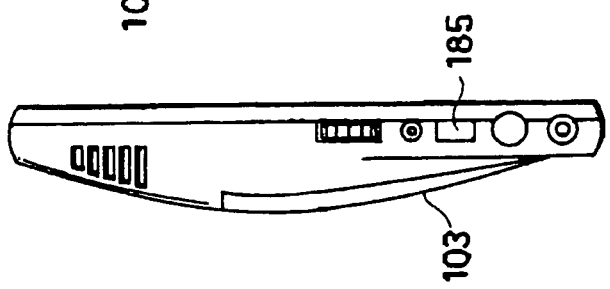
FIG. 2C
FIG. 2D
FIG. 2A
FIG. 2B

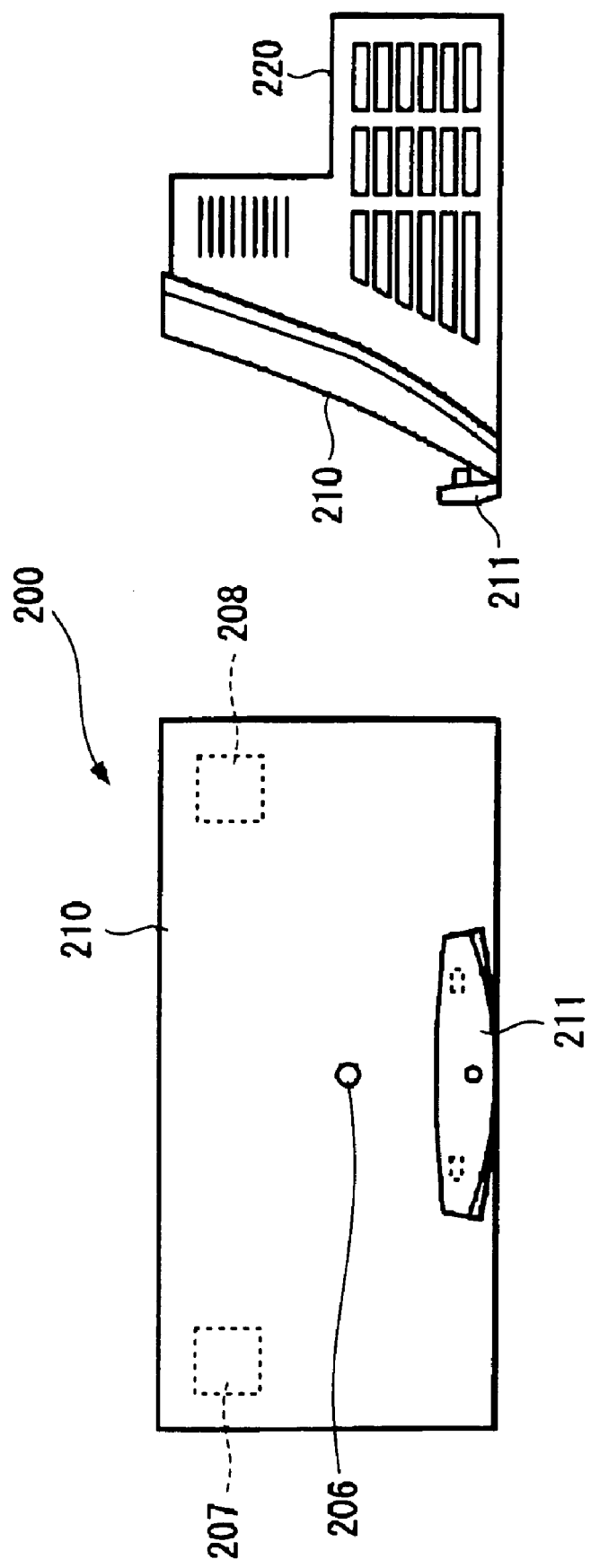

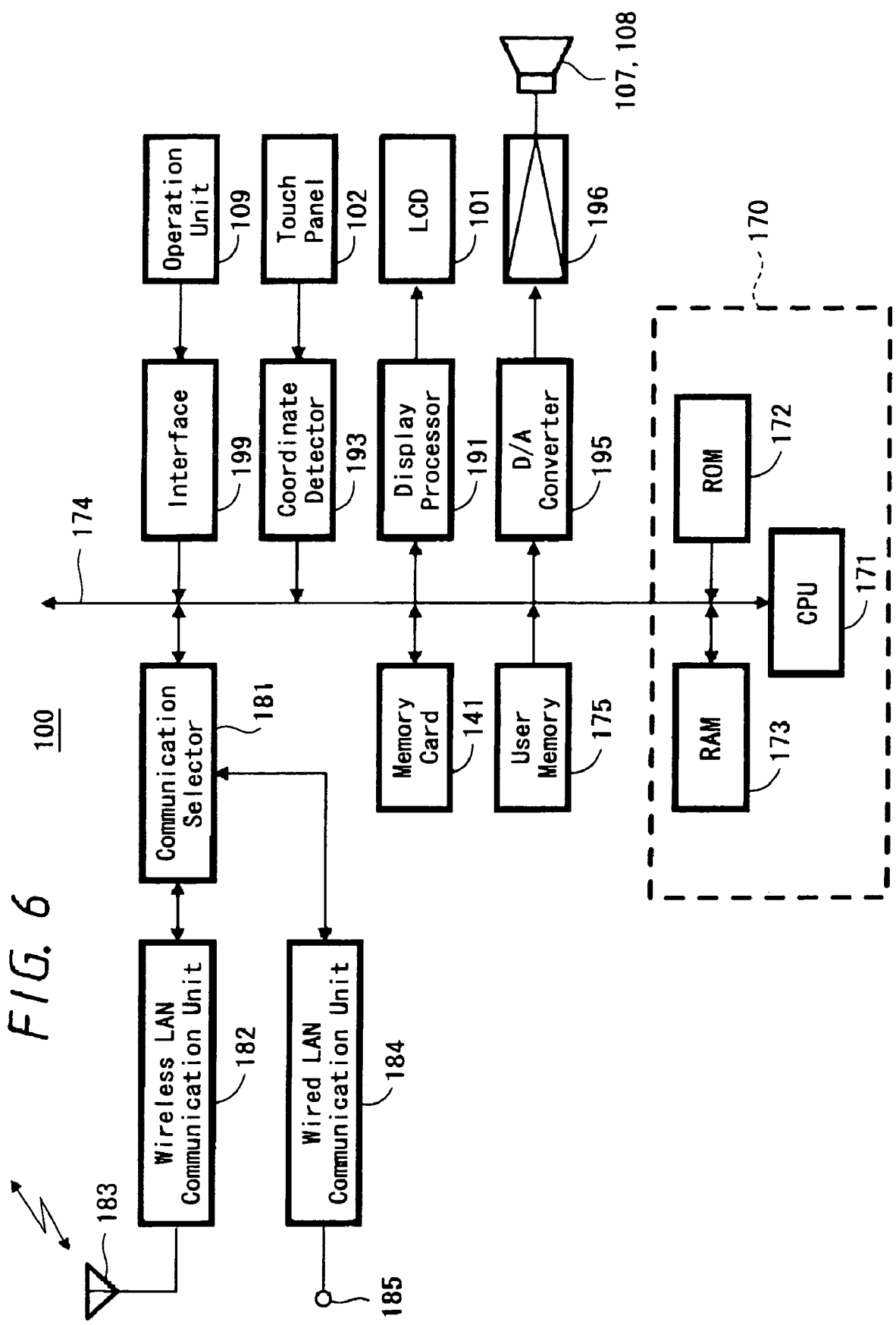

DISPLAY APPARATUS HAVING MULTIPLE SOURCE-DEPENDENT DISPLAY MODES

CROSS-REFERENCE TO RELATED APPLICATIONS

The present application claims priority from Japanese Application No. 2004-002504 filed Jan. 7, 2004, the disclosure of which is hereby incorporated by reference herein.

BACKGROUND OF THE INVENTION

The present invention relates to a display apparatus suitable for applying to a television receiver by which various video programs can be viewed.

Conventionally, when viewing content of television broadcasts or the like, a tuner is incorporated in a television receiver so that data received by the tuner can be displayed by the receiver. Accordingly, it is necessary to connect an antenna line to the television receiver and there is a restriction on portability and the like of the receiver.

In order to solve this problem, the applicant of the present invention has previously developed a display apparatus that has a configuration in which a base apparatus incorporating a reception means such as the tuner and a monitor apparatus in which video or the like is displayed are provided separately. The display apparatus including such base apparatus and monitor apparatus is described in Japanese Published Patent Application No. 2002-33714.

In the case of the display apparatus having this configuration, IEEE (The Institute of Electrical and Electronics Engineers) 802.11 standard method which is the standard of wireless LAN (Local Area Network) is, for example, employed to perform wireless communication between the base apparatus and the monitor apparatus. Therefore, there is no need to connect a video signal source such as the antenna line or a video reproducing apparatus to the monitor apparatus, and the monitor apparatus can be freely carried within a range where communication with the base apparatus is possible. Moreover, if there is a function to connect to the Internet on the side of the base apparatus, content such as video or audio, which are downloaded via the Internet, can be viewed on the monitor apparatus which can be carried freely. Furthermore, it is also possible to transmit and receive e-mail and to display the mail which is transmitted or received.

Meanwhile, when the display apparatus has many functions, including viewing television broadcasts, viewing a video program input into an external input terminal, viewing content downloaded via the Internet and the display of e-mail as described above, a certain device for obtaining operability or the like is required so that the respective functions can be operated easily. For example, in order to change a channel of the tuner or change an input on the monitor apparatus side, it is necessary to provide a large number of operating buttons in the monitor apparatus to perform those operations.

However, when providing a large number of operating buttons in the monitor apparatus, there needs to be much more space to provide those operating buttons on the monitor apparatus and the monitor apparatus becomes unavoidably large. Therefore, it is not preferable to provide too many buttons when considering the design of the monitor apparatus, and furthermore if simply a large number of buttons are provided, a user needs much time and effort to search for a necessary button, resulting in a problem that the operability thereof becomes unfavorable.

Further, it is also possible not to provide the operating buttons directly in the monitor apparatus, but to provide a remote control apparatus used with the monitor apparatus as a set, the remote control apparatus having a large number of operating buttons. However, even in that case the user needs much time and effort to search for a button indicating a required function if those large number of operating buttons are simply provided on the remote control apparatus, resulting in deficient operability.

In the display apparatus described in Japanese Published Patent Application No. 2002-33714, the display screen of the monitor apparatus is formed of a touch panel and when it is brought into a mode capable of operating, the operating buttons which are displayed as operation guidance are shown on the display screen, so that when the user touches the desired button on the touch panel, the corresponding operation is performed; and therefore there is no need to provide physical operating buttons in large numbers on the apparatus. However, even in such case, the operability is not improved simply by displaying a large number of buttons corresponding to the respective functions as the button display on the display screen of the touch panel.

Moreover, when the display screen is formed as a touch panel and is used as a screen for operation, there is a problem that while the operation screen is being displayed, it is not possible to view a video of the main object. In order to solve this problem, it has been proposed to display the main video in the display screen by reducing the display size thereof while the operation screen is being displayed. However, when the size of the main video is reduced uniformly for display while the operation screen is being displayed, there may be the case in which the display cannot be shown favorably, which is not preferable.

In addition, although the problem has been explained referring to the case where the display apparatus includes the base apparatus and the monitor apparatus separately provided as an example, there exists a similar problem even in the case of the display apparatus in which a tuner and display means or the like are integrated as one unit.

The present invention is made in view of such problems and aims at improving the operability of the display apparatus of this kind.

SUMMARY OF THE INVENTION

The present invention is a display apparatus including a tuner operable to receive a video signal; an external input unit into which a video signal is input from the outside; a display processor operable to select one of the video signal received by the tuner and the video signal obtained from the external input unit as a main video on which to perform display processing; a display unit operable to display video signals processed by the display processor; an operation unit; and a controller operable to cause the display processor to combine an operation guidance video with the main video to form a combined display based on a predetermined operation in the operation unit, and to display the combined display, wherein the combined display is displayed in a first display mode when the main video is the video signal received by the tuner, and the combined display is displayed in a second display mode when the main video is the video signal obtained from the external input unit.

Hence, when a predetermined operation is performed in the operation unit to display the operation guidance video combined with the main video, with respect to the display mode of the main video, the mode when the video signal received by the tuner is being displayed differs the mode when the video signal from the external input unit is being displayed, and therefore display modes suitable to the respective cases can be obtained.

According to the present invention, with respect to the display mode of the main video in the state where the operation guidance video is being displayed, the mode when the video signal received by the tuner is being displayed differs from the mode when the video signal from the external input unit is being displayed, so that a display mode of the main video suitable for each case can be obtained and, while viewing the main video, operations can be performed with higher operability in a state in which a favorable video display is realized.

That is, when the video signal received by the tuner is being displayed, the main video is displayed on the display unit in a display area having a display size which is the same as the display size of the display area of the main video when the operation guidance video is not combined with the main video, and then the operation guidance video is superimposed over a part of the display area of the main video; and when the video signal from the external input unit is being displayed, the main video is displayed on the display unit in a display area having a display size which is smaller than the display size of the display area of the main video when the operation guidance video is not combined with the main video, and then the operation guidance video is displayed in a vacant area made by the reduction of the display size of the display area of the main video, so that a favorable display mode which is suitable for each case and a higher operability can be obtained. In other words, when the video signal received by the tuner is displayed as the main video, the operation guidance video is displayed while the main video thus received is being displayed in the same size, and therefore the display size of the received video does not change and the received video can be viewed without difficulties, so that various operations can be performed favorably while viewing the received video. Moreover, when the video signal from the external input unit is displayed as the main video, the display size of the input video is made smaller and the operation guidance video is displayed in the vacant area, and therefore a comparatively large area can be secured as the display area for operation guidance, so that the operation guidance video which is used for carrying out an operation of multiple functions can be performed favorably.

More particularly, a video showing a list of channels which are selectable by the tuner is displayed as the operation guidance video when the video signal received by the tuner is being displayed as the main video, and a video for operating an output device from which the video signal input into the external input unit originates is displayed as the operation guidance video when the video signal obtained from the external input unit is being displayed as the main video, so that the display of each operation function can be performed favorably.

Furthermore, the operation unit may include a touch panel on a video display screen of the display unit so that the predetermined operation can be performed by touching the touch panel, and when the operation of touching the touch panel is detected, the controller causes the display processor to combine the operation guidance video and the main video to form the combined display and to display the combined display, and when the operation guidance video is displayed and the operation of touching the touch panel is detected, the controller causes the operation displayed on a touched area of the touch screen to be performed so that the user can perform various operations using the touch panel by only touching the touch panel while viewing the received video signal or the input video signal.

Further, in the case where a predetermined operation button is provided separately from the touch panel and an operation of that predetermined operation button is detected, a video of a list of channels selectable by the tuner, a video for the selection of an external input and a video for the selection of a function are superimposed as the operation guidance video over the main video to be displayed, so that it becomes possible to easily perform a basic operation such as a channel change, an input change and a selection of other functions by operating the predetermined operation button.

Moreover, since the tuner and the external input unit are accommodated in a casing provided separately from the display apparatus and the video signal is transmitted to the display apparatus either through wire or wirelessly, the present invention can be applied to a display apparatus in which the tuner and the video input unit are separately provided.

BRIEF DESCRIPTION OF THE DRAWINGS

FIG. 1 is an explanatory view showing an example of a display apparatus according to an embodiment of the present invention;

FIGS. 2A to 2D are views showing an example of a monitor apparatus according to an embodiment of the present invention, in which FIG. 2A is a front view, FIG. 2B is a left side view, FIG. 2C is a right side view and FIG. 2D is a top view;

FIGS. 3A and 3B are views showing an example of a base apparatus according to an embodiment of the present invention, in which FIG. 3A is a front view and FIG. 3B is a right side view;

FIGS. 5A and 5B are explanatory views showing an example of the use of the display apparatus of the present invention, in which FIG. 5A is a view of the monitor apparatus alone and FIG. 5B is a view showing a state where the monitor apparatus and the base apparatus are combined;

FIG. 6 is a block diagram showing an example of the configuration of the monitor apparatus according to an embodiment of the present invention;

DETAILED DESCRIPTION

Hereinafter, an embodiment of the present invention will be explained referring to the attached drawings.

FIG. 1 is a view showing an example of a system configuration according to this embodiment. In this embodiment, a display apparatus (television receiver) includes a base apparatus 200 which receives television broadcasts, inputs a video signal from a video signal source connected thereto, downloads content via the Internet and the like, and a monitor apparatus 100 which is formed to be freely attachable to the base apparatus 200. In this case, bidirectional wireless communication is performed between the monitor apparatus 100 and the base apparatus 200, so that a video signal and an audio signal can be transmitted wirelessly from the base apparatus 200 to the monitor apparatus 100 and also control commands or the like can be transmitted wirelessly from the side of the monitor apparatus 100 to the side of the base apparatus 200. In addition, in the case where the display apparatus is used in a place where a wireless communication environment is unfavorable, it is also possible to transmit signals or the like through wire by connecting a LAN cable (not illustrated) or similar means.

For example, wireless communication of a 2.4 GHz band may be used and the communication is performed by forming a communication network which conforms to the wireless LAN according to the IEEE 802.11 standard so that the wireless communication can be performed within a range from several tens of meters to 100 meters at the maximum (reaching distance becomes shorter indoors, though). When this wireless communication is performed, the monitor apparatus 100 and the base apparatus 200 perform authentication processing to recognize each other so that the communication can be performed only with an apparatus registered in advance, and the monitor apparatus 100, for example, is made not to communicate directly with a base apparatus of another system.

Figure 5A:
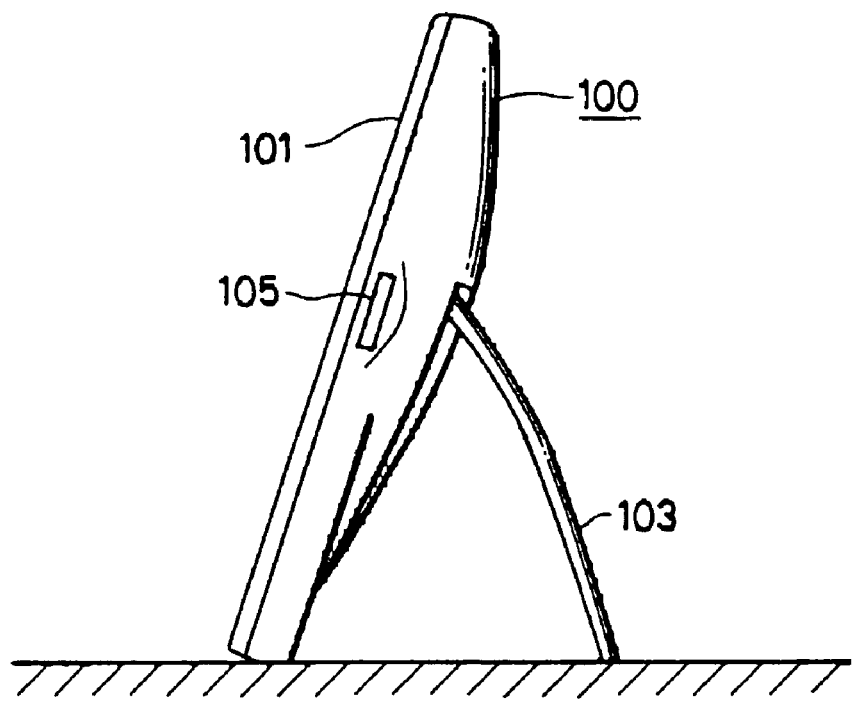
Figure 5B:
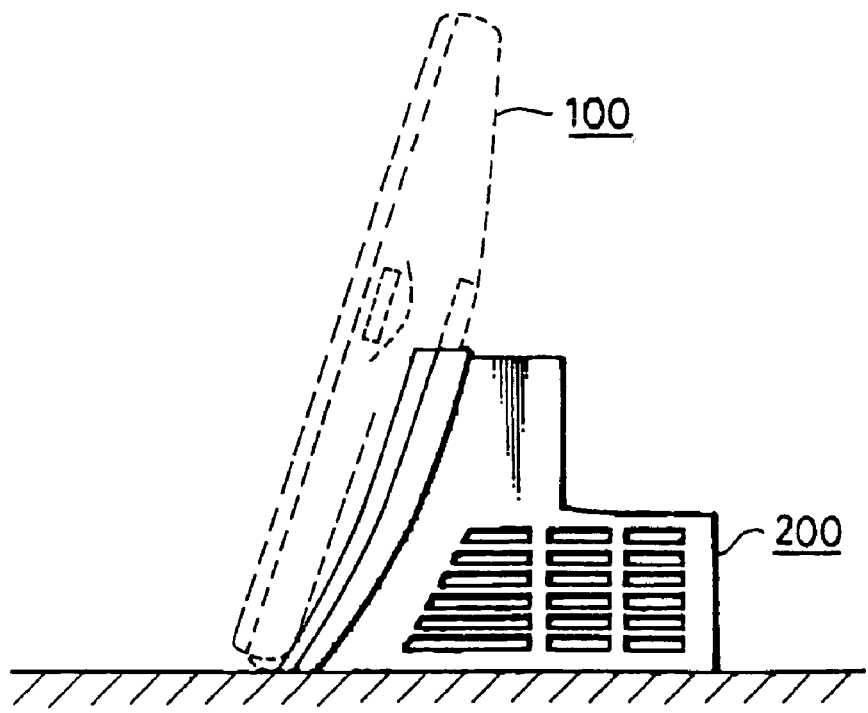

First, an example of the configuration of the monitor apparatus 100 is explained. FIGS. 2A to 2D are views showing the appearance of the monitor apparatus of this embodiment, and FIG. 5A shows a state in which the monitor apparatus 100 is set alone using a stand and FIG. 5B shows with a dashed line a state in which the monitor apparatus 100 is attached to the base apparatus 200.

As shown in FIGS. 2A to 2D, a liquid crystal display (LCD) 101 as a video display unit is provided in the front of the monitor apparatus 100, a touch panel 102 is provided on the display screen thereof, and speakers 107 and 108 are provided on the right and the left sides of LCD 101. Further, a plurality of operating buttons 109 are disposed around the liquid crystal display 101 or the like of the monitor apparatus 100. Buttons to perform basic operations, such as a power supply button, a volume up/down button and a channel up/down button, and buttons to perform a part of functions, such as an index button 109a, are the only operating buttons 109 provided, and more advanced operations are performed using the touch panel 102. An example of the use of the index button 109a is described later on. In addition, a touch pen accommodation portion 106 is arranged in the upper part of the monitor apparatus 100, in which a touch pen 10 for touching the screen can be accommodated.

Further, a card slot 105 to insert a memory card is provided in the monitor apparatus of this embodiment. Moreover, a LAN terminal 185 is provided in order to connect directly to the base apparatus or the like by using a LAN cable. Furthermore, an antenna (antenna 183 described later on) to communicate with the base apparatus is incorporated in the monitor apparatus.

Further, a stand 103 capable of opening to make the monitor apparatus 100 stand by itself is attached to the back of the monitor apparatus 100 of this embodiment. In addition, a rechargeable battery is incorporated in this monitor apparatus 100 so that power for operation can be supplied from the rechargeable battery.

Figure 4:
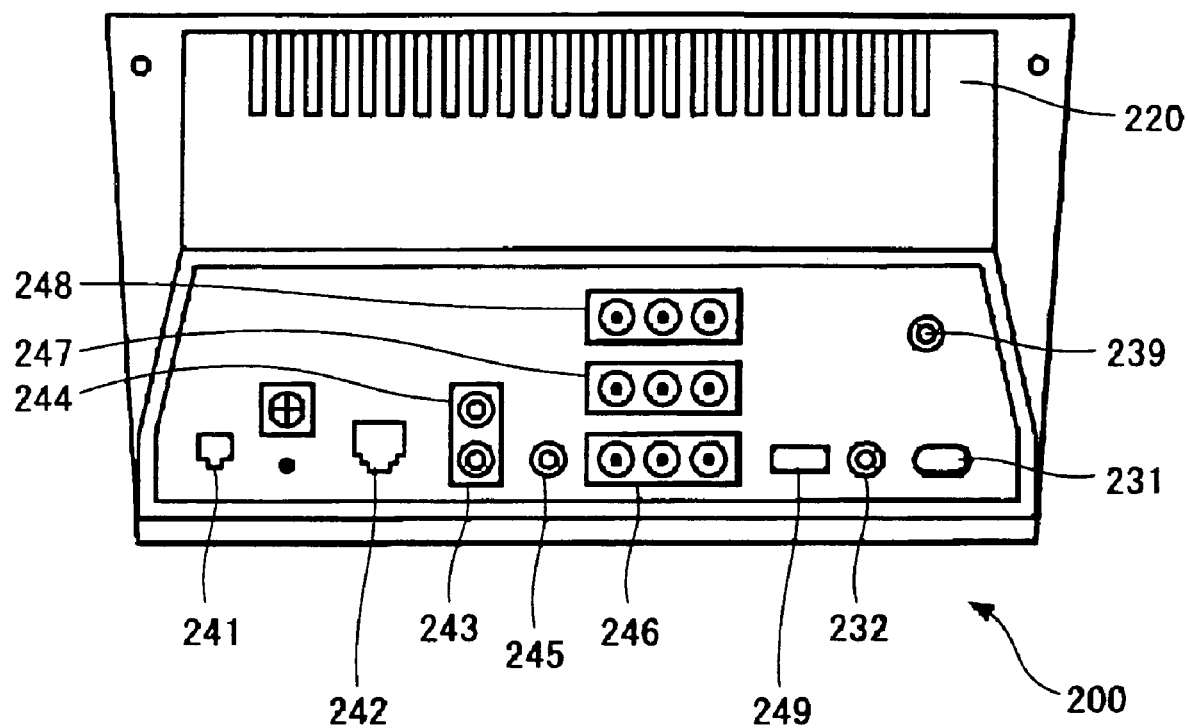
FIG. 4 is a rear view of the base apparatus of FIGS. 3A and 3B.

FIGS. 3A, 3B and 4 are diagrams showing an example of a configuration of the base apparatus 200 according to this embodiment. The base apparatus 200 is formed of a front portion 210 and a rear portion 220 joined together into one unit, and antennas 207 and 208 for performing wireless communication with the monitor apparatus 100 are disposed at right and left positions of the front portion 210.

The front portion 210 is made into a form slightly inclined toward the rear and a support 211 for standing the monitor apparatus 100 against the base apparatus 200 is provided at the lower part in the center thereof. Moreover, as shown in FIG. 4, in the lower part of the back of the rear portion 220 are provided a power button 231, a terminal 232 for connecting an AC power adaptor, a VHF/UHF terminal 239 for connecting an antenna line, a telephone line terminal 241, a LAN terminal 242, terminals 243 and 244 for connecting an infrared signal light-emitting unit called an AV mouse, an S-video input terminal 245, video and audio input terminals 246 and 247, a video and audio output terminal 248, a USB terminal 249 for connecting an external device such as a printer and the like and so on.

Since the monitor apparatus 100 and the base apparatus 200 are configured in this manner, the base apparatus 200 is installed fixedly in a living room or similar places, for example, and the monitor apparatus 100 can be carried to arbitrary places such as to other rooms or to a yard so that the user can view AV content such as a television broadcast on the monitor apparatus 100 available at hand at an arbitrary place. Moreover, access to the Internet, transmission and reception of e-mail and the like can also be performed through the base apparatus 200.

In this case, although the monitor apparatus 100 can be used by holding it by hand, the monitor apparatus 100 can also stand by itself on a suitable plane by opening the stand 103, as shown in FIG. 5A.

Further, as shown using a dashed line in FIG. 5B, the monitor apparatus 100 can be used by making it stand against the front portion 210 of the base apparatus 200. In this case, since a charge terminal on the bottom surface of the monitor apparatus 100 comes in contact with a charge terminal on the side of base apparatus 200 (neither of the charge terminals is illustrated), the rechargeable battery inside the monitor apparatus 100 can be charged by using the power from the base apparatus 200.

Next, a functional block configuration of the monitor apparatus 100 of this embodiment is explained by referring to FIG. 6. A controller 170 in the monitor apparatus 100 includes a central processing unit (CPU) 171 which is control means, a ROM 172 in which a program to be executed in this apparatus has been written and a RAM 173 which is used as a work area of the CPU 171 and the like. A program to execute various display processes described later on and the like has also been written in the ROM 172, and setting information required for the display settings is also stored using a part of an area in the RAM 173. A user memory 175 into which user data, such as a video file, is written is connected to a bus line 174 and a memory card 141 inserted into the slot 105 shown in FIG. 2 is also connected thereto.

Further, a wireless LAN communication unit 182 and a wired LAN communication unit 184 are connected to the bus line 174 through a communication selector 181, and commands and various data which should be transmitted to the base apparatus 200 and the like are processed to be transmitted in the wireless LAN communication unit 182 or in the wired LAN communication unit 184. That is, at the time of wireless transmission, commands and data are transmitted wirelessly from the antenna 183, and at the time of wired transmission, commands and data are transmitted using the cable connected to the LAN terminal 185. Moreover, data received by the wireless LAN communication unit 182 or data received by the wired LAN communication unit 184 is sent to the bus line 174.

Moreover, a display processor 191 which functions as display means is connected to the bus line 174, video data to be displayed is supplied thereto, and display processing is performed so that a video based on that video data is displayed on the LCD 101 which is display means. In this case, in the display processor 191, when video data received by a tuner 259 on the side of the base apparatus or video data obtained in external input interfaces 266 and 267 is, for example, wirelessly transmitted and supplied, the processing to display that video is performed. Furthermore, when video data for display guidance is supplied from the side of the controller 170, for example, the processing to display the display guidance video on the LCD 101 is performed. Although a specific example of a display mode with respect to this display guidance video is described later on, there is a first case in which only the display guidance video is displayed and a second case in which the display guidance video is displayed after being superimposed over the video based on the video data supplied from the base apparatus. In addition, when the video is displayed, the controller 170 determines the type of the displayed video (namely, whether it is the video received by the tuner or the video input into the external input terminal, and so on).

Further, the speakers 107 and 108 are connected to the bus line 174 through a digital/analog converter 195 and an amplifier 196.

Furthermore, the touch panel 102 is connected to the bus line 174 through a coordinate detector 193 and the operating unit 109 is connected to the bus line 174 through an interface 199. With respect to the touch panel 102, the coordinate detector 193 detects the position touched on the display screen of the LCD 101 which is the display unit and the detected data is transmitted to the controller 170. Although the touch pen 10 shown in FIG. 2, for example, is used here to make a contact to the touch panel 102, another configuration can be employed in which a user's finger or the like directly touches the screen to be detected. Data indicating the operation of each operating button arranged in the operating portion 109 is also transmitted to the controller 170.

Figure 7:
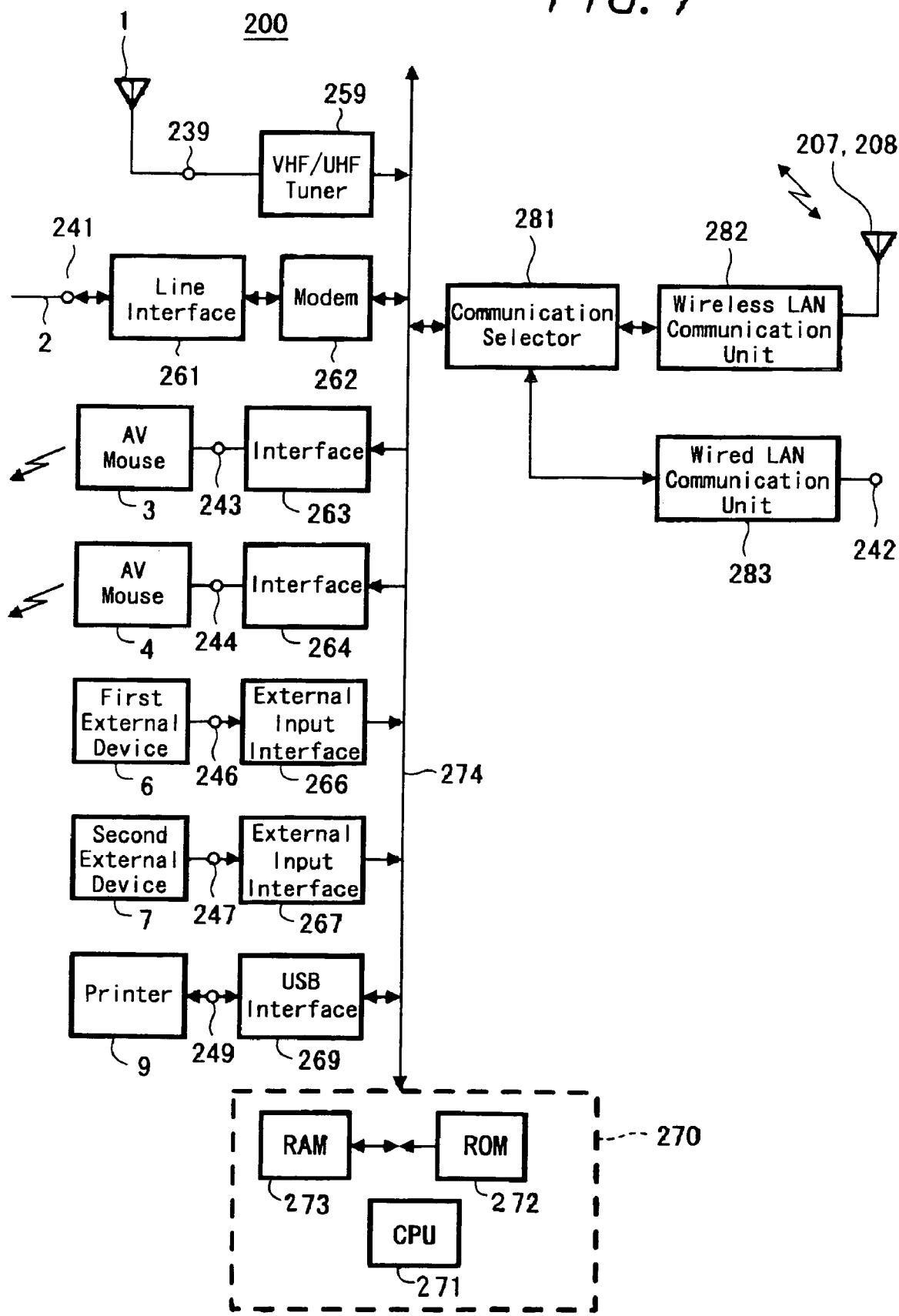
FIG. 7 is a block diagram showing an example of the configuration of the base apparatus according to an embodiment of the present invention.

Next, a functional block configuration of the base apparatus 200 according to this embodiment is explained referring to FIG. 7. A controller 270 of the base apparatus 200 includes a central processing unit (CPU) 271 which is control means, a ROM 272 in which a program to be executed by this apparatus has been written and a RAM 273 which is used as a work area of the CPU 271 or the like. A program to execute processes required for performing various displays on the side of the monitor apparatus 100 has also been written in the ROM 272.

A VHF/UHF antenna 1 is connected through an antenna line to the VHF/UHF terminal 239 which is a connection terminal of the antenna line, a ground-based television broadcast output which is received by the antenna 1 is tuned and demodulated by the VHF/UHF tuner 259 in the base apparatus 200, and video data and audio data are taken out to be sent to a bus line 274.

A telephone line 2 is connected to the line terminal 241 to which a line interface 261 is connected, and the line interface 261 is connected to the bus line 274 through a modem 262. It is possible to connect to the Internet or the like via this telephone line 2. In addition, it is possible to arrange a terminal, an interface and a modem which are capable of connecting to other lines for Internet connection, such as an ADSL (Asymmetric Digital Subscriber Line), rather than the telephone line.

A digital CS broadcast tuner, a digital BS tuner or the like, for example, is connected as a first external device 6 to the video and audio input terminal 246 which is an external input for video and audio, and the video data and the audio data supplied from those devices are sent to the bus line 274 through the external input interface 266 in the base apparatus 200.

A DVD player, a hard disc recorder or the like, for example, is connected as a second external device 7 to the video and audio input terminal 247 which is an external input for video and audio, and the video data and the audio data supplied from those devices are sent to the bus line 274 through the external input interface 267 in the base apparatus 200.

AV mice 3 and 4, which are infrared signal light-emitting devices, are connected to terminals 243 and 244, respectively. Those terminals 243 and 244 are connected to the bus line 274 through interfaces 263 and 264, respectively, in the base apparatus 200. Remote control signals transmitted from light-emitting units of the AV mice 3 and 4 as infrared signals are received by light-receiving units provided for the first external device 6 and the second external device 7 through a command signal from the controller 270, so that the first external device 6 and the second external device 7 can be remotely controlled on the side of the base apparatus 200. In addition, with respect to the first external device 6 and the second external device 7 which are connected to the video and audio input terminals 246 and 247, a kind, a manufacturer and the like of a device can be set by a user operation or the like, and the setting information is stored in the memory within the controller 270. Based on the stored information, the remote control signal of a corresponding code can be transmitted. Further, when an operating panel of a device is displayed on the side of the monitor apparatus 100, the operating panel corresponding to the registered device is displayed by using this information. For this reason, the information on the first external device 6 and on the second external device 7 is also stored in the memory within the controller 170 on the side of the monitor apparatus 100.

A printer 9, for example, is connected to the USB (Universal Serial Bus) terminal 249, and a command and data for printing which are sent to the bus line 274 are supplied to the printer 9 through a USB interface 269.

Moreover, a wireless LAN communication unit 282 and a wired LAN communication unit 283 are connected to the bus line 274 through a communication selector 281, and commands and various data which should be transmitted to the monitor apparatus 100 or the like are processed to be transmitted in the wireless LAN communication unit 282 or in the wired LAN communication unit 283, so that those commands and data are wirelessly transmitted from the antennas 207 and 208 at the time of wireless transmission and are transmitted using the cable connected to the LAN terminal 242 at the time of wired transmission. Further, data received by the wireless LAN communication unit 282 or data received by the wired LAN communication unit 283 is sent to the bus line 274.

Figure 8:
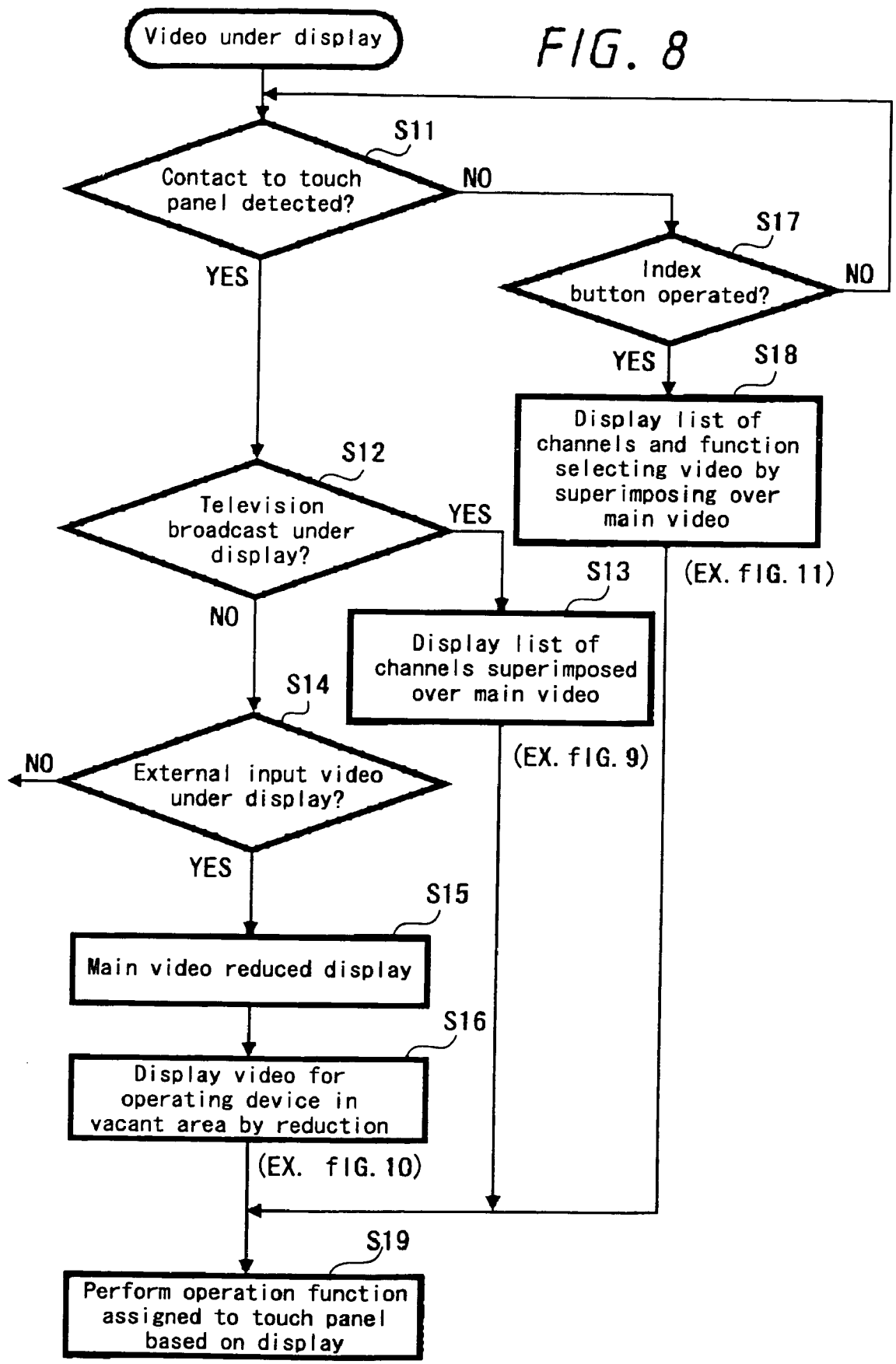
FIG. 8 is a flow chart showing an example of processing with an operation during a display of video according to an embodiment of the present invention.

Next, an example of processing at the time of viewing using the monitor apparatus 100 and the base apparatus 200 thus configured is explained with reference to the flow chart shown in FIG. 8 and also with reference to examples of displays on the LCD 101 of the monitor apparatus 100 shown in FIGS. 9 through 11. The flow chart of FIG. 8 is a diagram showing an example of processing in the case where a user operation is performed while viewing video (and also listening to audio accompanying the video) on the monitor apparatus 100 of this embodiment. Judgment processing which is shown in the flow chart of FIG. 8 is to be performed such that the judgment is basically made by the controller 170 on the side of the monitor apparatus 100 which sends a command to the display processor 191 to make each display processing performed. Note that video, such as the video obtained from the video signal received by the tuner and the video obtained from the video signal input into the external input terminal, which are displayed on the monitor apparatus 100, is referred to as the main video in the following explanation.

Hereinafter, an explanation is made in accordance with the flow chart of FIG. 8. While the video (here, basically a moving picture) is being displayed on the LCD 101 of the monitor apparatus 100, it is determined whether contact with the touch panel 102 using the touch pen or the like has been detected (Step S11). Then, when contact with the touch panel 102 has been detected, it is determined whether the main video currently being displayed is the video of a television broadcast received by the tuner 259 in the base apparatus 200 (Step S12), and when the main video is the video of a television broadcast, the list of channels or the like is superimposed over a right side of that main video and is displayed as an operation guidance display without changing the screen size of the main video (Step S13). Then, based on the display mode of the operation guidance display at that time, the controller 170 performs an operation function assignment of the touch panel 102 so that an operation being displayed can be performed (Step S19).

Figure 9:
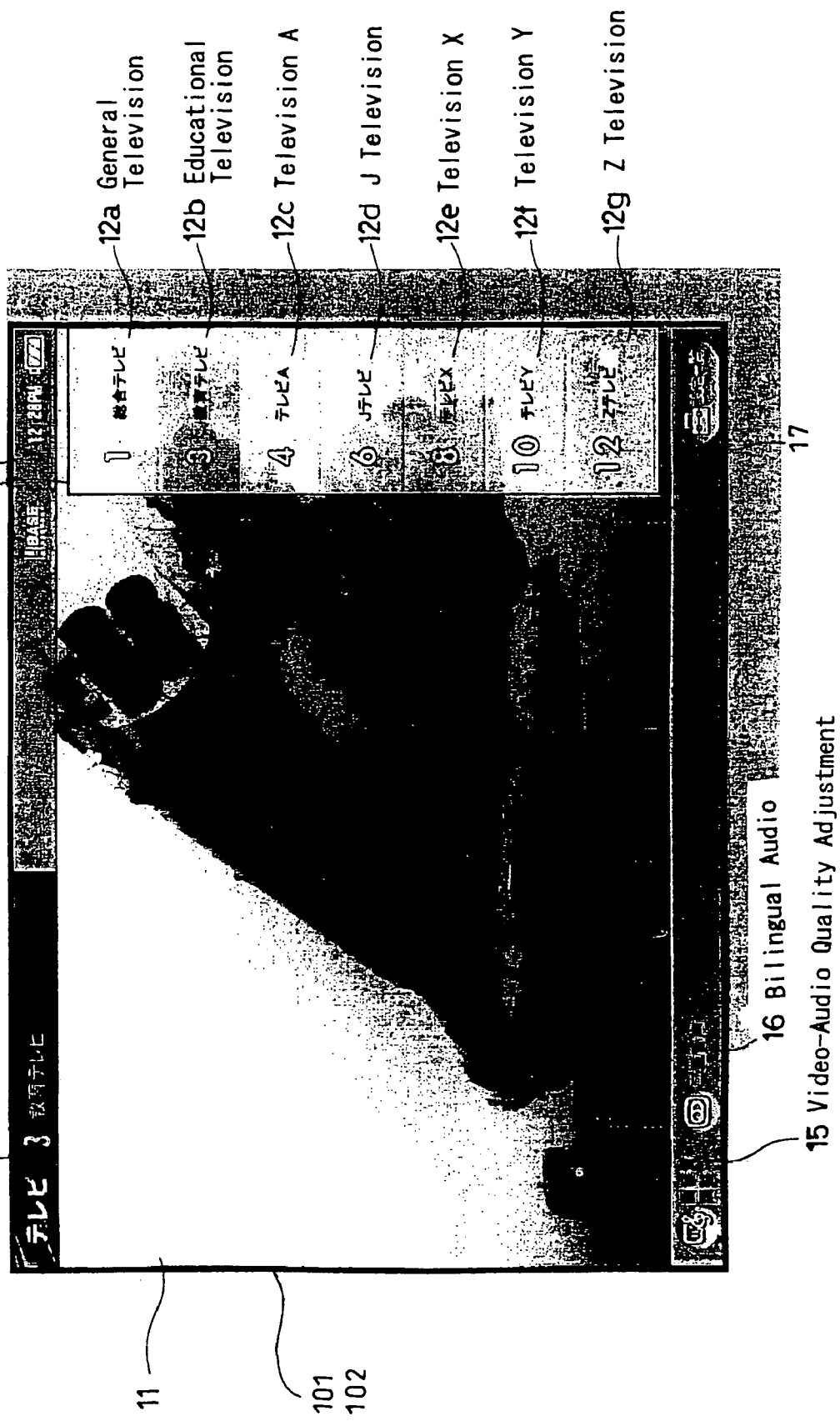
FIG. 9 is an explanatory view showing an example of a display according to an embodiment of the present invention.

FIG. 9 is a view showing an example of the display on the LCD 101 at step 13. As shown in FIG. 9, a main video display 11 is shown in which the video of the television broadcast received by the tuner 259 is displayed using the whole display screen of the LCD 101, and there is shown an operation guidance display 12 on the right side such that the operation guidance display is combined with the main video display 11. The display size of the main video display 11 remains the same as that when no operation guidance display 12 is shown. The operation guidance display 12 is hereupon a video display of the list of channels which are selectable by the tuner 259. Specifically, channel numbers which are set in advance to be received by the tuner 259 and abbreviations of broadcast stations are displayed as displays 12a, 12b, - - - , 12g in the order of channel number. This operation guidance display 12 is made into a translucent display in this example, so that the main video of the portion overlapped with the position of that display can be identified (a state in which the main video and the guidance video are overlapped and displayed is not clearly illustrated in the figure due to the restrictions in drawing). Then, when a display area among displays 12a through 12g is touched using the touch pen 10 or the like, the controller 170 performs processing to send a command to the base apparatus 200 so as to change the channel to the channel number displayed in that area.

Further, as shown in FIG. 9, there is a receiving channel display 13 at the upper left corner of the display screen which shows the channel number and the abbreviation of the broadcast station which is currently being received, and there is a current state display 14 at the upper right corner showing a remaining battery life, time, the communication state with the base apparatus and the like. Furthermore, there are a video and audio quality adjustment button display 15 and a bilingual audio button display 16 at a lower left corner of the display screen, and a setting list button display 17 at the lower right corner, and when each of the button displays 15 through 17 is touched by the touch pen or the like, the controller 170 makes a control to perform the operation which is shown by the button displayed in the touched area. Specifically, when each operation of those button displays is performed, another display to perform each detailed setup which is not illustrated is displayed on the screen. Those displays 13 through 17 are also made into translucent displays so that the main video of a portion overlapped with the display position can be identified.

The explanation returns to the flow chart of FIG. 8 in which, when it is determined at step S12 that the video of a television broadcast is not currently being displayed, it is determined whether the main video currently being displayed is a video obtained from the video signal input into the video-audio input terminal 246 or 247 which is arranged as the external input terminal of the base apparatus 200 (Step S14). Here, when it is determined that the main video is an external input video, the size of the main video is reduced and displayed (Step S15) and the operation guidance display for operating the device which is registered as being connected to the selected input terminal 246 or 247 at that time is displayed in a combined display state where the operation guidance display is made to display in a vacant area caused by that reduction (Step S16). Further, based on the display mode of the operation guidance display at that time, the controller 170 performs the operation function assignment of the touch panel 102, so that the operation being displayed can be performed (Step S19).

Figure 10:
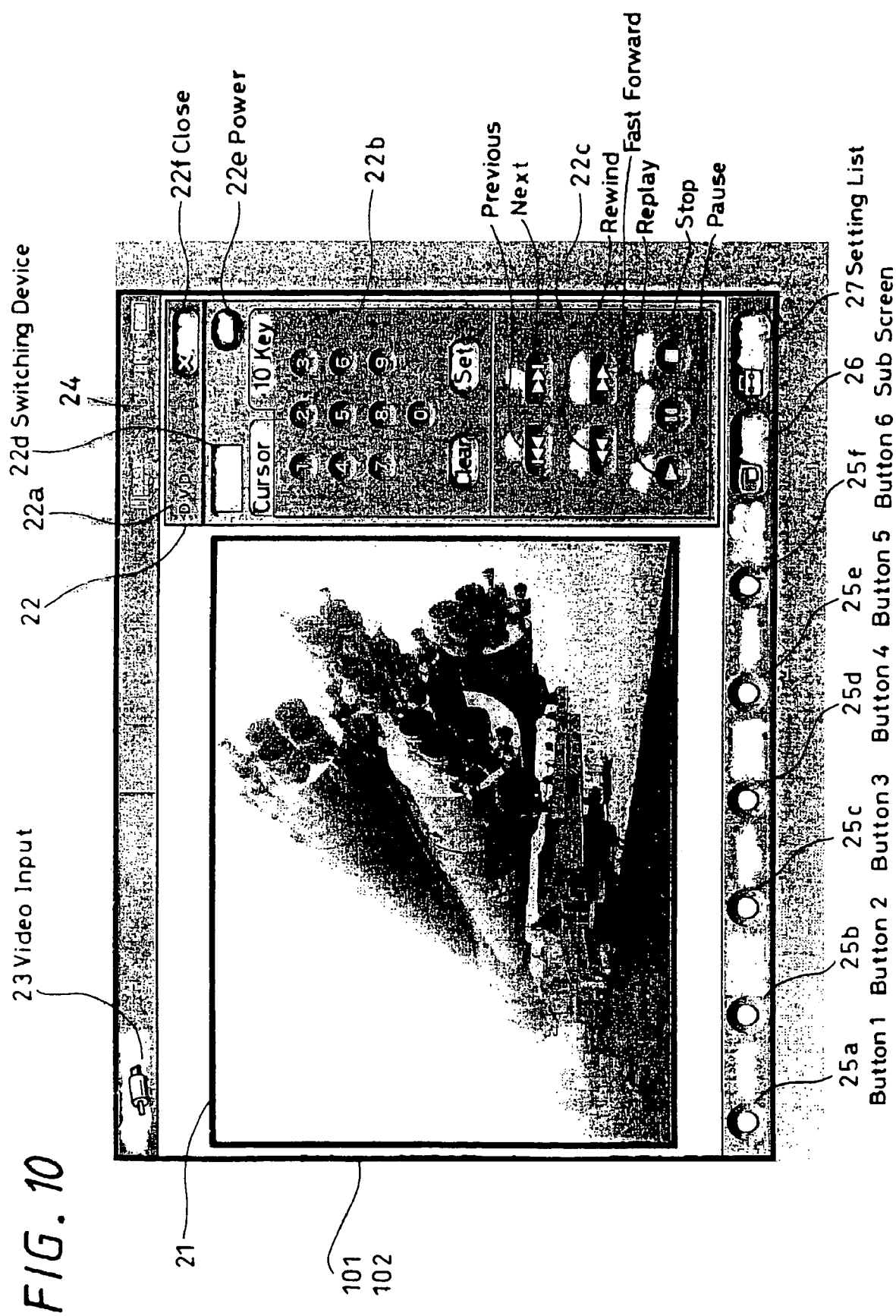
FIG. 10 is an explanatory view showing an example of a display according to an embodiment of the present invention.

FIG. 10 is a view showing an example of a display on the LCD 101 at step S16. As shown in FIG. 10, there is a main video display 21 in a size which is somewhat reduced from the size of the whole display screen of the LCD 101 so that an operation guidance display 22 for operating the registered device can be displayed in the vacant space made on the right side by the size reduction. The operation guidance display 22 in the example of FIG. 10 is one in which a DVD (Digital Video Disc or Digital Versatile Disc) reproducing apparatus is registered as the connection device, and shows a device name display 22a, a ten key display 22b, a reproduction operation display 22c such as replay, stop, fast forward and rewind, a device switching display 22d, a power supply display 22e and a display 22f to close (clear) the operation guidance display 22. Further, when a display area among the displays 22a through 22e is touched by the touch pen 10 or the like, the controller 170 performs processing to send a command which is displayed in that area to the base apparatus 200. In the controller 270 of the base apparatus 200, when the command is received, the remote control signal corresponding to that command is transmitted from the corresponding AV mouse 3 or 4.

Further, as shown in FIG. 10, there is a display 23 at the upper left corner of the display screen showing an input number which is currently selected, and there is a current state display 24 at the upper right corner showing the remaining battery life, time, the communication state with the base apparatus and the like. Furthermore, there are a plurality of button displays 25a through 25f, a sub-screen button display 26 and a setting list button display 27 at the lower end of the display screen, and when each of the button displays 25 through 27 is touched by the touch pen or the like, the controller 170 makes a control to perform the operation which is shown by the button displayed in the touched area. Specifically, when each operation of those button displays is performed, another display to perform each detailed setup which is not illustrated is displayed in the screen. Note that, in the case of FIG. 10, the display area of the main video and that of the operation guidance display are not overlapped within one screen, so that the operation guidance display is not a translucent display.

The explanation returns to the flow chart of FIG. 8 in which, when it is determined that an external input video is not currently being displayed at step S14, the main video currently being displayed is another kind of video and therefore another display processing is performed in accordance with that kind of video. An explanation of this another display processing is omitted herein.

Further, when contact with the touch panel is not detected at step S11, it is determined whether the index button 109a arranged in the monitor apparatus 100 has been operated (Step S17). When the operation of this index button 109a is not detected, the processing returns to the contact detection determination of the touch panel at step S11. Further, when the operation of the index button 109a is detected at step S17, the operation guidance video which shows a list of channels and a function selection video is displayed in the combined display state where the operation guidance video is superimposed with the main video (Step S18). Furthermore, based on the display mode of the operation guidance display at that time, the controller 170 performs the operation function assignment of the touch panel 102 so that the operation being displayed can be performed (Step S19).

Figure 11:
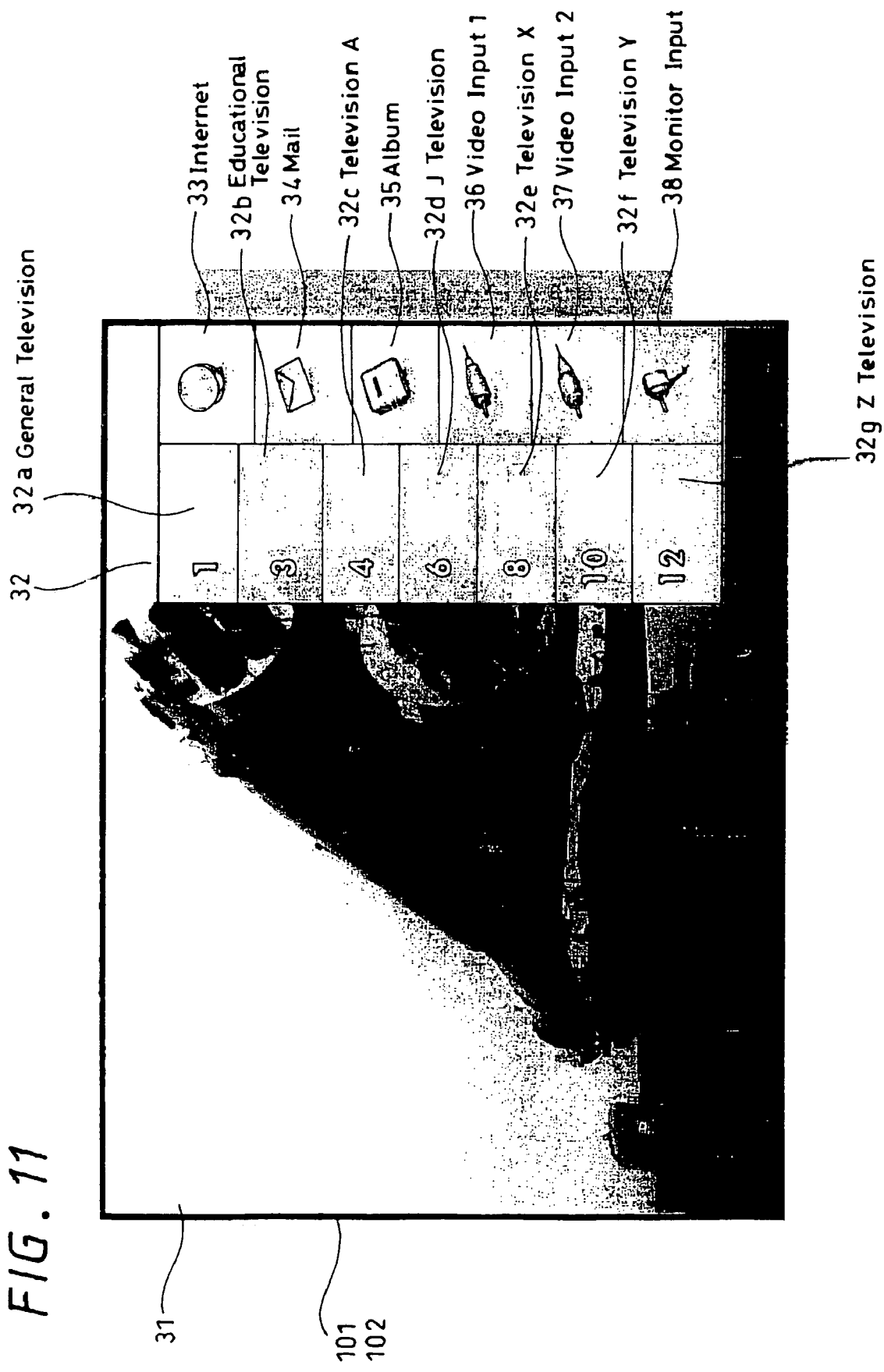
FIG. 11 is an explanatory view showing an example of a display according to an embodiment of the present invention.

FIG. 11 is a view showing an example of a display on the LCD 101 at step S18. As shown in FIG. 11, there is a main video display 31 (hereupon, the video of the television broadcast which is received by the tuner 259) which uses the whole display screen of the LCD 101, and an operation guidance display 32 on the right side such that the operation guidance display is combined with the main video display 31. When the index button is operated, the display size of the main video display 31 remains the same as when the operation guidance display 32 is not shown, no matter which video is being displayed as the main video. The operation guidance display 32 includes the display of the video for the list of channels which are selectable by the tuner 259, the display of the video for the selection of an external input and the display of the video for the selection of a function. Specifically, the channel numbers which are preset to be received by the tuner 259 and the abbreviations of the broadcast stations are displayed as displays 32a through 32g in the order of channel number. Also, an Internet connection function display 33, a mail function display 34 and an album display 35 are displayed as a list of functions provided for this apparatus. Further, as a display for selecting an external input there are arranged a display 36 for selecting a video input 1 (corresponding to the input terminal 246), a display 37 for selecting a video input 2 (corresponding to the input terminal 247) and a display 38 for selecting a monitor input. The operation guidance display 32 is here made into a translucent display so that the main video of the portion overlapped with that display position can be identified (in this view, a state where the main video and the guidance video are overlapped and displayed is not clearly illustrated due to the restrictions in drawing). Further, when a display area among the displays 32a through 32g is touched by the touch pen 10 or the like, the controller 170 performs the processing to send a command to the base apparatus 200 so as to switch the channel to the channel number displayed in that area. Moreover, when any of the function display areas 33 through 35 is touched by the touch pen 10 or the like, the controller 170 performs the processing to send a command to the base apparatus 200 so that the function displayed in that area is displayed. Furthermore, when the display area to select any input of the displays 36 through 38 is touched by the touch pen 10 or the like, the controller 170 performs the processing to send a command to the base apparatus 200 so that the input displayed in that area is selected and displayed.

As described above, according to this embodiment, settings have been performed so that the display mode in which the operation guidance display is displayed can be changed in accordance with the kind of main video which is being displayed, and therefore a suitable display mode according to each state can be set.

Note that, although in the configuration heretofore explained, the touch panel is disposed on the display panel so that the operation can be performed when each area displayed by the operation guidance display is touched directly by the touch pen or the like, the same processing can be performed without using a touch panel. For example, a cursor display may be used within the screen in a state where displays similar to the ones shown in FIG. 9 through FIG. 11 are presented, an operation is confirmed in a state where a displayed position of that cursor is overlapped with each area of the operation guidance display, and the function shown in the operation guidance display at the position which is overlapped with that cursor may be performed.

Moreover, each of the display examples shown in FIGS. 9 through 11 shows one example of a display in each case and the present invention is not limited to those displays. For example, in the example of FIG. 9 in which the received video of a television broadcast is displayed as the main video, the operation guidance display 12 is made into a translucent display; however, a display of similar size and position may be displayed without making it translucent so that the main video of the portion which overlaps with that display 12 cannot be seen.

Furthermore, in the embodiment mentioned above, the present invention is applied to a display apparatus having a system configuration in which the monitor apparatus and the base apparatus are separately provided; however, it is also possible to be applied to a display apparatus in which a tuner, an external input terminal and the like are integrally formed with the display unit.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

The invention claimed is:

1. A display apparatus, comprising:
   a tuner operable to receive a video signal;
   an external input unit into which a video signal is input from the outside;
   a display processor operable to select one of the video signal received by the tuner and the video signal obtained from the external input unit as a main video on which to perform display processing;
   a display unit operable to display video signals processed by the display processor;
   an operation unit; and
   a controller operable to cause the display processor to combine an operation guidance video with the main video to form a combined display based on a predetermined operation in the operation unit and to display the combined display, wherein the combined display is displayed in a first display mode when the main video is the video signal received by the tuner, and the combined display is displayed in a second display mode when the main video is the video signal obtained from the external input unit;
   wherein the combined display includes an indication of a remaining battery life for the display unit and an indication of a state of communication between the display unit and the tuner.

2. The display apparatus according to claim 1, wherein the first display mode displays the main video on the display unit in a display area having a display size which is the same as a display size of the display area of the main video when no operation guidance video is displayed, and displays the operation guidance video superimposed with a part of the display area of the main video; and the second display mode displays the main video on the display unit in a display area having a display size which is smaller than a display size of the display area of the main video when no operation guidance video is displayed, and displays the operation guidance video in a vacant area made by the reduction of the display size of the display area of the main video.

3. The display apparatus according to claim 2, wherein when the video signal received by the tuner is displayed as the main video, a video of a list of channels which are selectable by the tuner is displayed as the operation guidance video, and when the video signal obtained from the external input unit is displayed as the main video, a video for operating an output device from which the video signal input into the external input unit originates is displayed as the operation guidance video.

4. The display apparatus according to claim 1, wherein the operation unit includes a touch panel on a video display screen of the display unit so that the predetermined operation can be performed by touching the touch panel, and when the operation of touching the touch panel is detected, the controller causes the display processor to combine the operation guidance video and the main video to form the combined display and to display the combined display, and when the operation guidance video is displayed and the operation of touching the touch panel is detected, the controller causes the operation displayed on a touched area of the touch screen to be performed.

5. The display apparatus according to claim 1, wherein the tuner and the external input unit are accommodated in a casing provided separately from the display apparatus, and the selected video signal is transmitted to the display apparatus either through wire or wirelessly.

* * * * *